Feb. 19, 1929.
H. DINHOFER
1,702,893
FINGER RING
Filed March 25, 1927
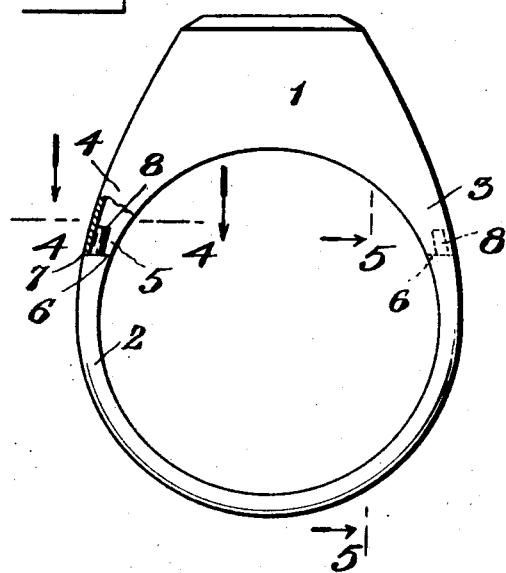
Fig.1.
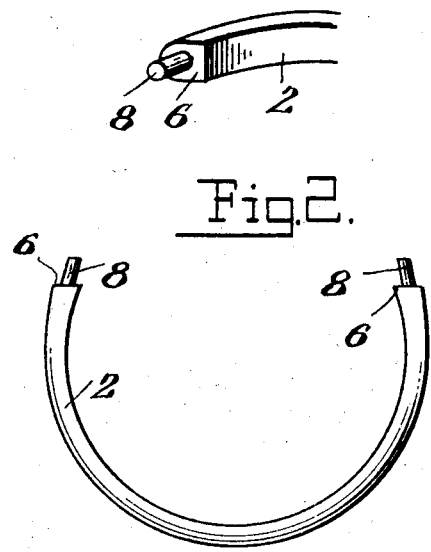
Fig.3.
Fig.2.
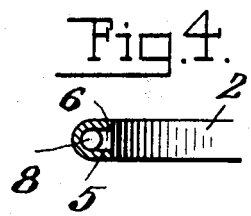
Fig.4.
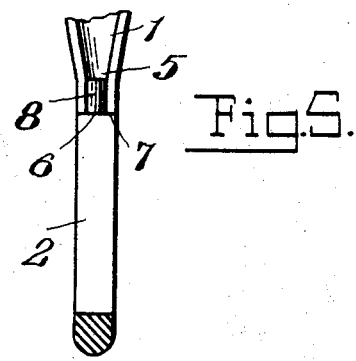
Fig.5.
Inventor
Harry Dinhofer
By his Attorney
Harry Radzinsky Patented Feb. 19, 1929.

1,702,893

UNITED STATES PATENT OFFICE.

HARRY DINHOFER, OF NEW YORK, N. Y.

FINGER RING.

Application filed March 25, 1927. Serial No. 178,168.

This invention relates to a ring and has for its object to provide a means whereby the various parts of a finger ring may be expeditiously assembled or connected together with the least amount of labor and time expended.

A further object of this invention is to provide a means whereby the parts of a ring, which, when connected together form the complete ring, may be securely united and a solid and strong joint between these various parts is readily effected.

With these objects and such other objects as may hereinafter appear in view, I have devised the particular arrangement of parts set forth below and more particularly pointed out in the claim appended hereto.

Reference is to be had to the accompanying drawing, forming a part hereof, in which Figure 1 is a side elevation of a ring made in accordance with my invention, with a part of the same being broken away to disclose construction;

Figure 2 is a side elevation of the ring shank;

Figure 3 is a perspective view of one end of the shank disclosing the aligning stud thereon;

Figure 4 is a sectional view on the line 4—4 of Figure 1, looking in the direction of the arrows; and Figure 5 is a sectional view on the line 5—5 of Figure 1, looking in the direction of the arrows.

Throughout the various views of the drawings, similar reference characters designate similar parts.

In the embodiment of my invention disclosed in the accompanying drawing, the ring is shown as being composed of several parts, the ring top being indicated at 1, and the ring shank at 2. The ring top 1 is preferably composed of sheet metal and is thus substantially channel-shaped in cross-section or hollow. The ring top 1 is provided with a pair of downwardly extending ends 3 and 4 which are channel-shaped as at 5, like the remainder of the top 1.

The shank 2 is adapted to be joined by solder or the like to the top 1 to form the complete ring. Said shank 2 has upper ends or terminations in the form of shoulders 6 and extending from said shoulders in the same plane as the shank, are projecting studs 8. To form the complete ring, the shank 2 is placed so that its shoulders 6 abut up against the ends 7 on the extensions 3 and 4 of the top 1. In this position, the studs 8 normally find their way into the channel-shaped recess 5 which is of such size that its walls closely embrace the studs 8 so that the shank 2 is readily held in the proper alignment with the top 1 and a soldered joint is then made.

The projections 8 are preferably made of such diameter that they very snugly fit within the channel-shaped spaces 5 on the parts 3 and 4 and are embraced by the walls of said spaces. By reason of this, the outer face of the shank 2 is brought into proper alignment with the outer face of the top 1 and a smooth, continuous and unbroken job in joining the parts results.

The shank 2 may be made slightly resilient if desired, so that the normal tendency of the same to flatten out will cause the studs 8 to frictionally bear against the channel-shaped parts 5, so that the parts 1 and 2 of the ring will firmly hold together while the soldering operation is taking place without the use of a clamp or other holding means.

From the foregoing, it is obvious that my invention is not to be restricted to the exact embodiment shown, but is broad enough to cover all structures coming within the scope of the annexed claim.

What I claim is:

A construction for facilitating the permanent joinder of finger ring parts to form a single, continuous, encircling ring, comprising a ring top having a pair of downwardly projecting channel-shaped shank parts, a ring shank having its terminations adapted to be soldered thereto, said shank having a shoulder near each of its ends and a stud projecting from each of said shoulders, said studs projecting upwardly into the channel-shaped extensions when the ring top and shank are placed together, these channel-shaped extensions being of such size that the walls of the same closely embrace and partly surround said studs, the outer face of the shank aligning with the outer face of the channel-shaped shank parts, so that said shank and shank parts when permanently joined by soldering combine to form a continuous permanent immovable shank.

Signed at the city, county and State of New York, this 24th day of March, 1927.

HARRY DINHOFER.